(12) United States Patent
Nakano et al.

(10) Patent No.: US 9,221,643 B2
(45) Date of Patent: Dec. 29, 2015

(54) RECORDING APPARATUS

(71) Applicant: SEIKO EPSON CORPORATION, Tokyo (JP)

(72) Inventors: Yosuke Nakano, Nagano (JP); Kazuhisa Nakamura, Nagano (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 14/569,917

(22) Filed: Dec. 15, 2014

(65) Prior Publication Data

US 2015/0175376 A1 Jun. 25, 2015

(30) Foreign Application Priority Data

Dec. 25, 2013 (JP) ................................. 2013-267421

(51) Int. Cl.
*B65H 31/00* (2006.01)
*B65H 31/02* (2006.01)

(52) U.S. Cl.
CPC ........ *B65H 31/02* (2013.01); *B65H 2301/4212* (2013.01); *B65H 2402/46* (2013.01); *B65H 2403/41* (2013.01); *B65H 2403/732* (2013.01); *B65H 2405/324* (2013.01); *B65H 2405/3322* (2013.01); *B65H 2801/15* (2013.01)

(58) Field of Classification Search
CPC ............ B65H 1/00; B65H 1/04; B65H 31/00; B65H 2403/41; B65H 2403/70; B65H 2405/32; B65H 2405/324; B65H 2405/35; B65H 31/02; B65H 2301/4212; B65H 2402/46; B65H 2801/15; B65H 2405/3322; B65H 2403/732; B41J 11/58; B41J 13/10; B41J 13/103; B41J 13/106; B41J 23/02
USPC .................................................. 271/207, 213
See application file for complete search history.

(56) References Cited

U.S. PATENT DOCUMENTS

2013/0258416 A1* 10/2013 Nakano et al. ................ 358/296
2014/0035218 A1* 2/2014 Koyama et al. ............... 271/3.14

FOREIGN PATENT DOCUMENTS

JP 2000-327203 A 11/2000

* cited by examiner

*Primary Examiner* — David H Bollinger
(74) *Attorney, Agent, or Firm* — Global IP Counselors, LLP

(57) ABSTRACT

A recording apparatus includes a drive source, a medium receiving tray, a clutch, and a load applying unit. The medium receiving tray is configured to be driven by the drive source that is a motor having a cogging torque. The clutch is configured to idle when a predetermined amount of torque or more is applied, and provided to a power transmission pathway between the drive source and the medium receiving tray. The load applying unit is configured to apply a rotational load to a rotational body in the power transmission pathway closer to a side of the drive source than the clutch. The rotational load applied to the rotational body is set to a magnitude causing the clutch to idle before a rotational shaft of the motor rotates against the cogging torque when the medium receiving tray is operated by applying an external force to the medium receiving tray.

8 Claims, 9 Drawing Sheets

RECORDING APPARATUS

CROSS-REFERENCE TO RELATED APPLICATIONS

This application claims priority to Japanese Patent Application No. 2013-267421 filed on Dec. 25, 2013. The entire disclosure of Japanese Patent Application No. 2013-267421 is hereby incorporated herein by reference.

BACKGROUND

1. Technical Field

The present invention relates to a recording apparatus for recording onto a recording medium.

Recording apparatuses include inkjet printers, copiers, facsimiles, and other such apparatuses.

2. Related Art

A configuration in which a mobile element of the apparatus, e.g., a paper discharge tray, an operation panel, or the like is made to operate automatically via a driving force of a motor is in some instances employed in a printer in order to improve the ease of use for the user.

For example, Japanese laid-open patent publication No. 2000-327203 discloses a configuration in which a paper discharge tray for stacking a sheet material is either stowed inside an apparatus main body or exposed from the apparatus main body by a driving means.

A configuration disclosed in Japanese laid-open patent publication No. 2000-327203, where a paper discharge tray is moved in and out by the power of a motor shall here be taken as an example to describe a problem thereof. First, when the paper discharge tray is being automatically moved out from the apparatus main body, if there is an obstacle in a region of protrusion of the paper discharge tray, then there is the risk that the paper discharge tray could collide with the obstacle, consequently causing damage to the paper discharge tray or to the drive mechanism thereof. There is additionally the risk that over-rotation of the motor could cause the drive mechanism to break. This results in the need to employ a configuration where a clutch with which a friction disk is used (called a "friction clutch" below) is provided to a power transmission pathway between the motor and the paper discharge tray, to cause slipping (idling) to be produced in the friction clutch when at least a predetermined torque is produced in the power transmission path.

Users also have demands, however, such as wishing to be able to operate the paper discharge tray (move the paper discharge tray in and out) not by the power of the motor but rather directly by hand. In such a case, a rotational shaft of the motor is turned by moving the paper discharge tray, and cogging of the motor at this time may in some instances cause an unpleasant feeling or noise for the user.

As such, in order to avoid such problems, preferably, slipping (idling) is produced with the friction clutch before the motor is turned in association with cogging when the paper discharge tray is operated directly by hand, and then the slipping (idling) continues with the friction clutch. That is to say, preferably, the friction clutch has a smaller slipping start torque than the cogging torque.

Because the friction clutch makes use of a force of friction, there exist the two concepts of the torque of when slipping is produced when torque is applied to the friction clutch (this being torque caused by static frictional force) and the torque during the time when the slipping is taking place (this being torque caused by kinetic frictional force), but the phrase "slipping start torque" in the present specification signifies the former, i.e., the torque caused by static frictional force.

Then, if the slipping start torque of the friction clutch ends up being reduced due to the reasons described above, slipping may in some instances end up taking place in the friction clutch when an attempt is made to move the paper discharge tray in or out by the driving force of the motor, i.e., it may in some instances be impossible to drive the paper discharge tray normally.

SUMMARY

Therefore, the present invention has been made in view of such circumstances, and an objective thereof is to achieve both reliable driving of a target of driving by a drive source and comfort for when the target of driving is being directly operated by a user.

In order to solve the aforementioned problems, a recording apparatus as in a first aspect of the invention comprises a drive source, a target of driving configured to be driven by the drive source, a clutch configured to idle in response to a predetermined amount of torque or more being applied and provided to a power transmission pathway between the drive source and the target of driving, and a load applying unit configured to apply a rotational load to a rotational body in the power transmission pathway closer to a side of the drive source than the clutch.

According to the present aspect, the invention has a configuration provided with: a drive source; a target of driving that is driven by the drive source; and a clutch that idles in response to when a predetermined amount of torque or more is applied, the clutch being provided to a power transmission pathway between the drive source and the target of driving; wherein also provided is a load applying unit for applying a rotational load to a rotational body in the power transmission pathway closer to the drive source side than the clutch; therefore, the drive source can be prevented from being turned before the clutch slips (idles) when the target of driving is operated by applying an external force to the target of driving.

This makes it possible to avoid the problems (unpleasant feeling, noise, and the like) associated with when the drive source is turned. In addition, because the drive source can be prevented from being turned before the clutch slips (idles), there is no need to set a low slipping start torque for the clutch, and the target of driving can be reliably driven by the drive source.

In a second aspect of the invention according to the first aspect, the drive source is a motor that has a cogging torque, and the rotational load applied to the rotational body by the load applying unit is set to a magnitude that causes the clutch to idle before a rotational shaft of the motor rotates against the cogging torque when the target of driving is operated by applying an external force to the target of driving.

According to the present aspect, the drive source is a motor that has a cogging torque, and the rotational load applied to the rotational body by the load applying unit is set to a magnitude that causes the clutch to idle before a rotational shaft of the motor rotates against the cogging torque when the target of driving is operated by applying an external force to the target of driving; therefore, the motor can be prevented from being turned before the clutch slips (idles) when the target of driving is operated by applying an external force to the target of driving, and the problems (unpleasant feeling, noise, and the like) associated with when the motor is turned can be avoided.

In a third aspect of the invention according to the first or second aspect, the rotational body is the rotational shaft of the drive source, a pinion gear attached to the rotational shaft, or a first gear enmeshed with the pinion gear.

When the position to which the load applying unit applies the load is apart from the drive source, the load that needs to be applied to the rotational body becomes greater due to the reduction ratio of the gear, and there is the risk that the configuration for applying the load is increased in scale. However, according to the present aspect, the rotational body is the rotational shaft of the drive source, a pinion gear attached to the rotational shaft, or a first gear enmeshed with the pinion gear, and therefore the load that needs to be applied by the load applying unit can be reduced, and as a result, the configuration of the loading applying unit can be prevented from increasing in scale.

In a fourth aspect of the invention according to any of the first through third aspects the target of driving is a medium receiving tray which is configured to receive a recording medium that has been discharged and which obtain power from the drive source and is thereby displaced between a first position of displacement in a direction of projecting out from a main body of the recording apparatus and a second position of displacement in a direction of being pulled into the main body.

According to the present aspect, the effects of any of the first through third aspects described above can be obtained in a configuration where the target of driving is a medium receiving tray.

In a fifth aspect of the invention according to the fourth aspect, the recording apparatus further comprises a rotation detecting unit configured to detect rotation of a second gear in the power transmission pathway closer to a side of the target of driving than the clutch, and a control unit configured to control the drive source. The control unit is configured to drive the drive source such that the second gear continues rotating in the same direction when the rotation detecting unit has detected rotation of the second gear.

According to the present aspect, the control unit drives the drive source so that the second gear continues rotating in the same detection when the rotation detecting unit has detected rotation of the second gear, and therefore when the target of driving is moved by the application of an external force, driving of the target of driving in the same direction begins, thereby improving the user experience.

BRIEF DESCRIPTION OF THE DRAWINGS

Referring now to the attached drawings which form a part of this original disclosure.

DETAILED DESCRIPTION OF EXEMPLARY EMBODIMENTS

Modes for carrying out the present invention shall be described below with reference to the accompanying drawings.

Figure 1:
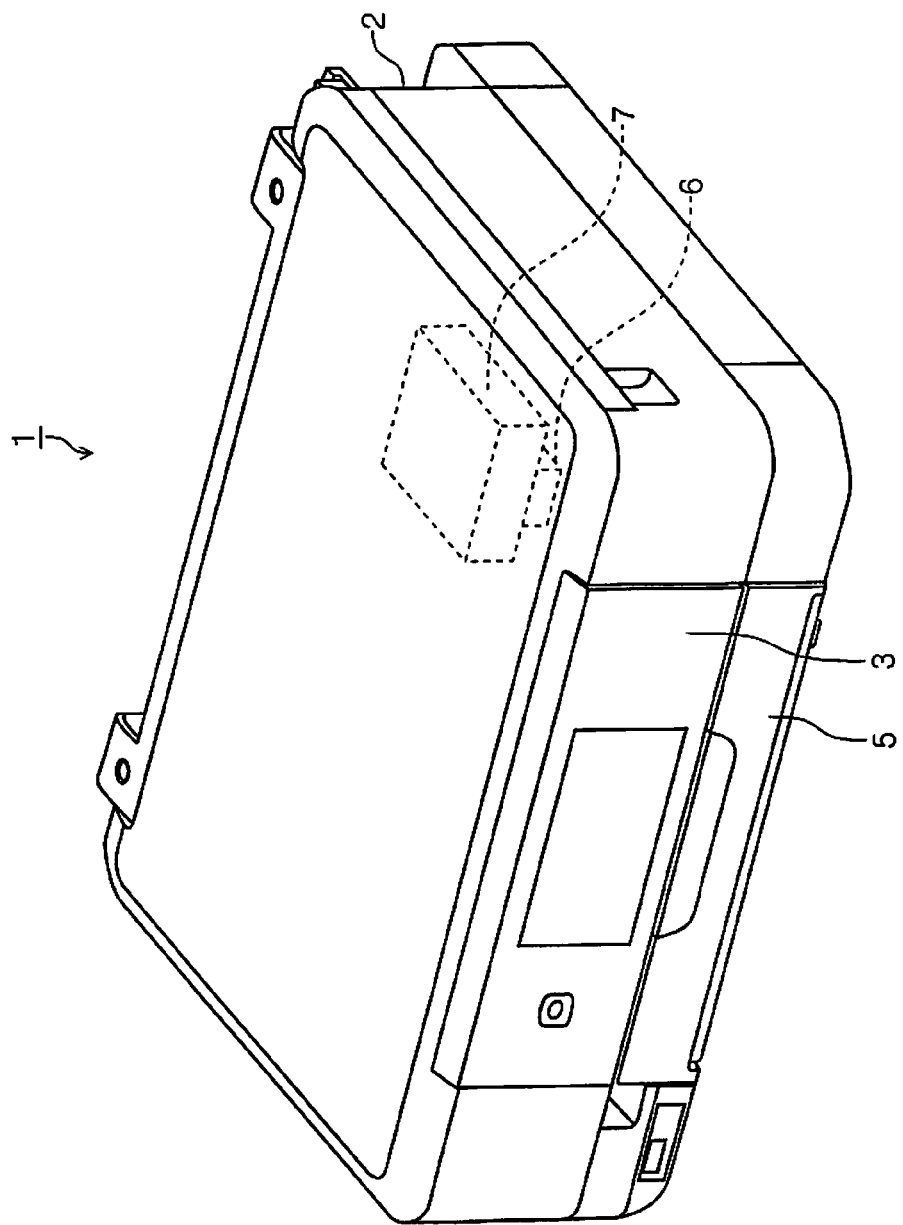
FIG. 1 is a perspective view illustrating the outer appearance of a printer in a state where an operation panel has been closed and a paper discharge receiving tray has been stowed.
Figure 2:
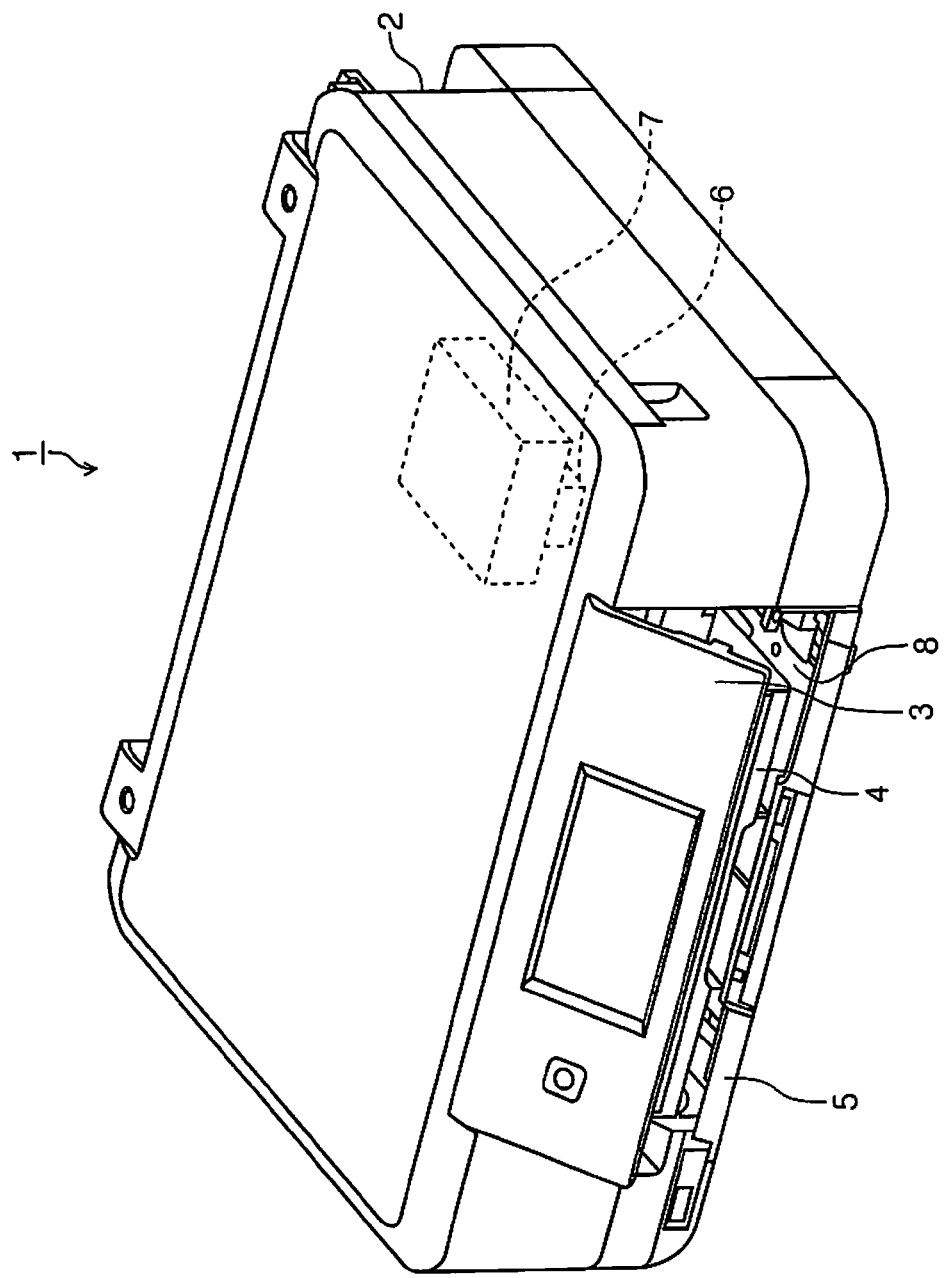
FIG. 2 is a perspective view illustrating the outer appearance of a printer in a state where an operation panel has been opened and a paper discharge receiving tray has been stowed.
Figure 3:
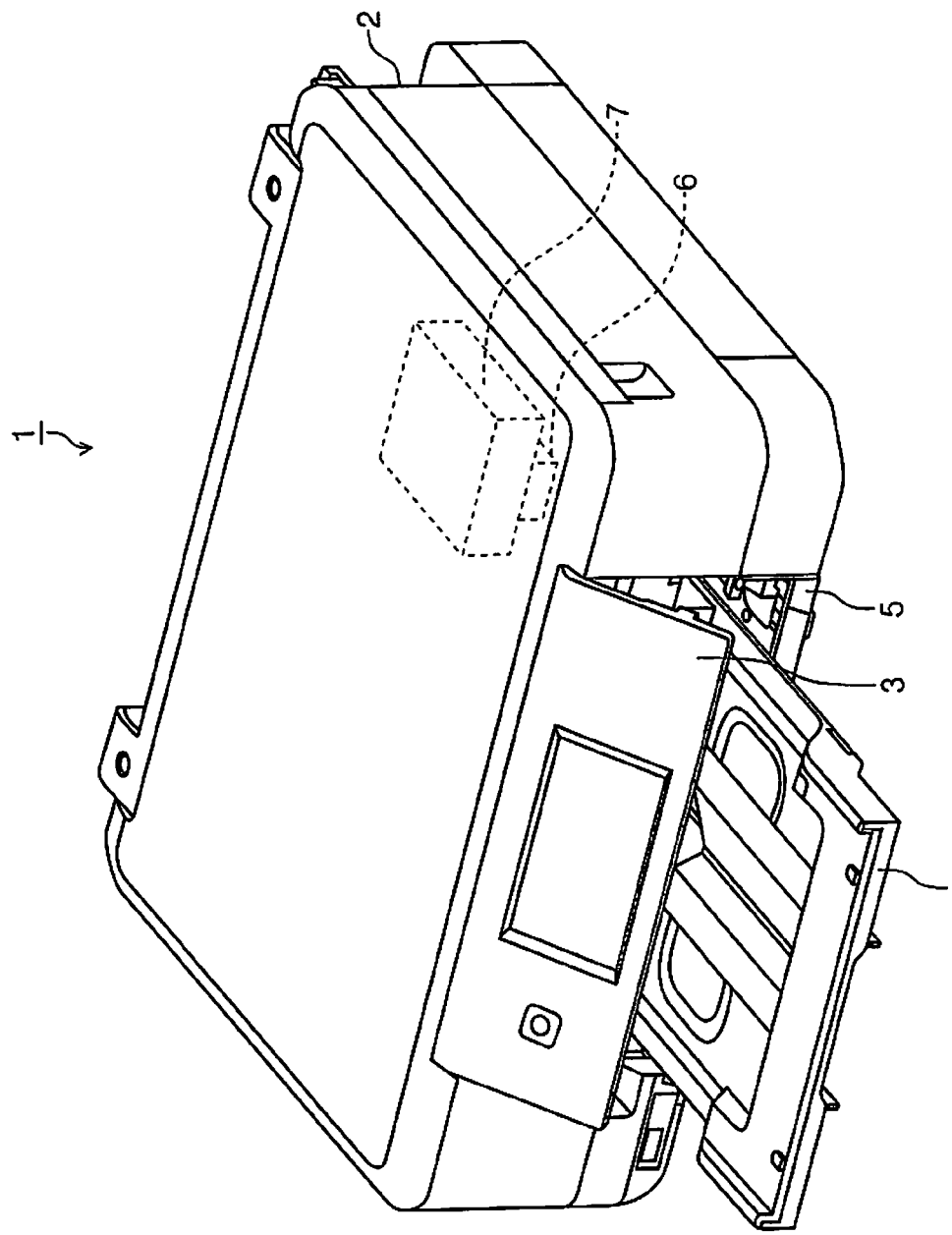
FIG. 3 is a perspective view illustrating the outer appearance of a printer in a state where an operation panel has been opened and a paper discharge receiving tray has been projected out.

FIGS. 1 to 3 are perspective views illustrating the outer appearance of an inkjet printer (hereinbelow "printer") 1, which is one embodiment of a recording apparatus as in the present invention, where FIG. 1 illustrates a state where an operation panel 3 has been closed and a paper discharge receiving tray 4 has been stowed, FIG. 2 illustrates a state where the operation panel 3 has been opened and the paper discharge receiving tray 4 has been stowed, and FIG. 3 illustrates a state where the operation panel 3 has been opened and the paper discharge receiving tray 4 has been projected out.

Figure 4:
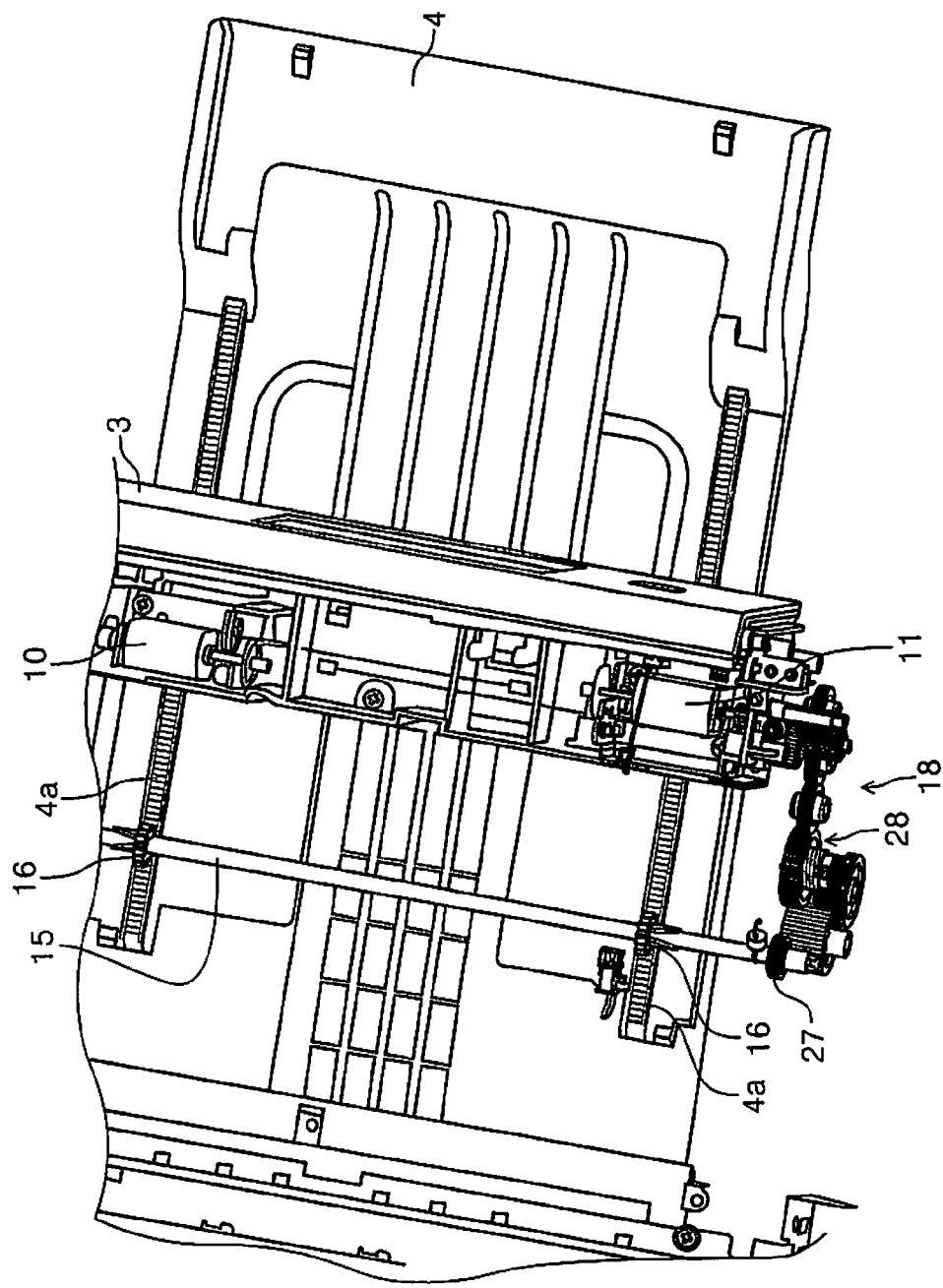
FIG. 4 is a drawing illustrating the configuration of a transmission mechanism and a paper discharge receiving tray.
Figure 5:
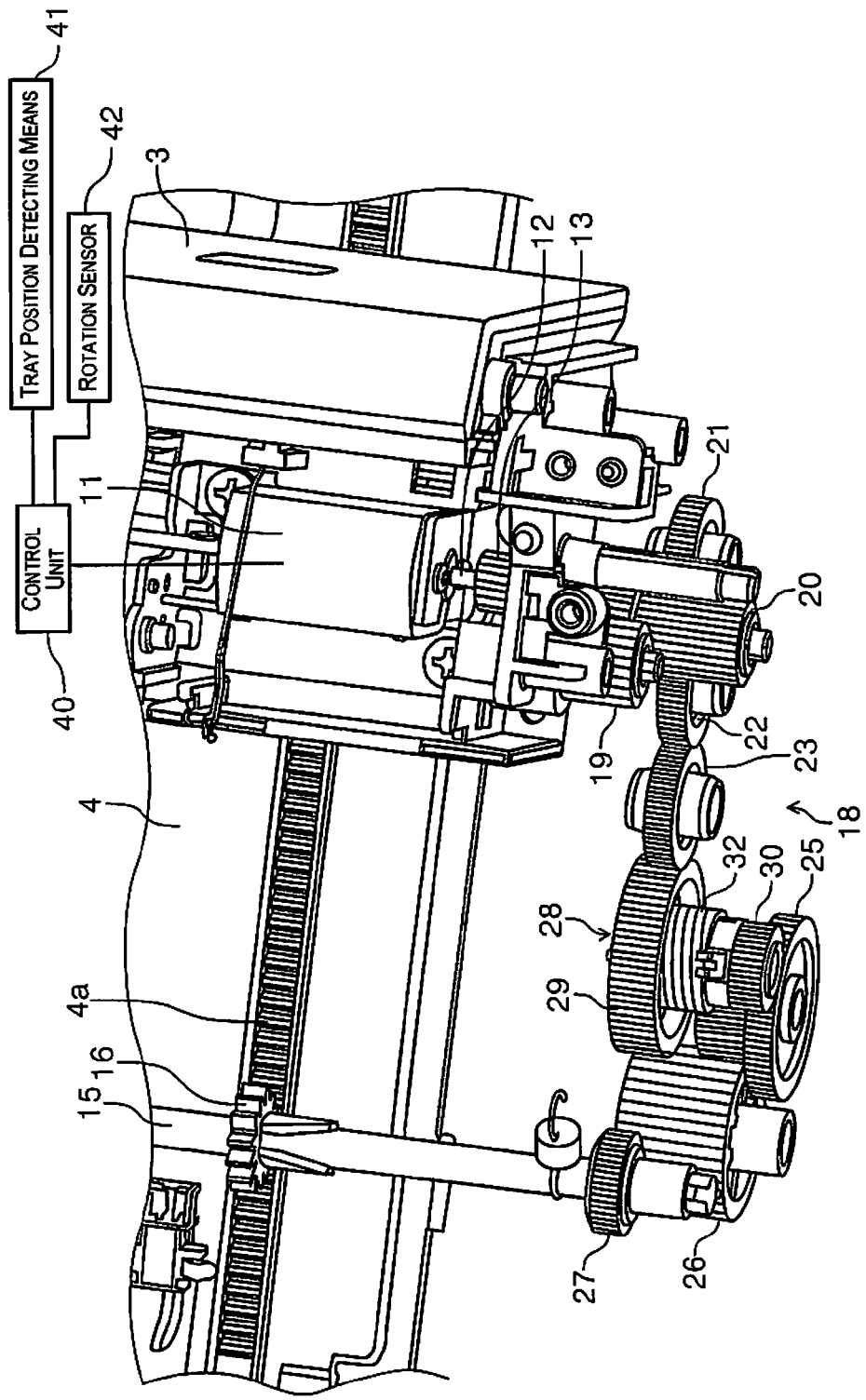
FIG. 5 is an enlarged perspective view of a transmission mechanism.
Figure 6:
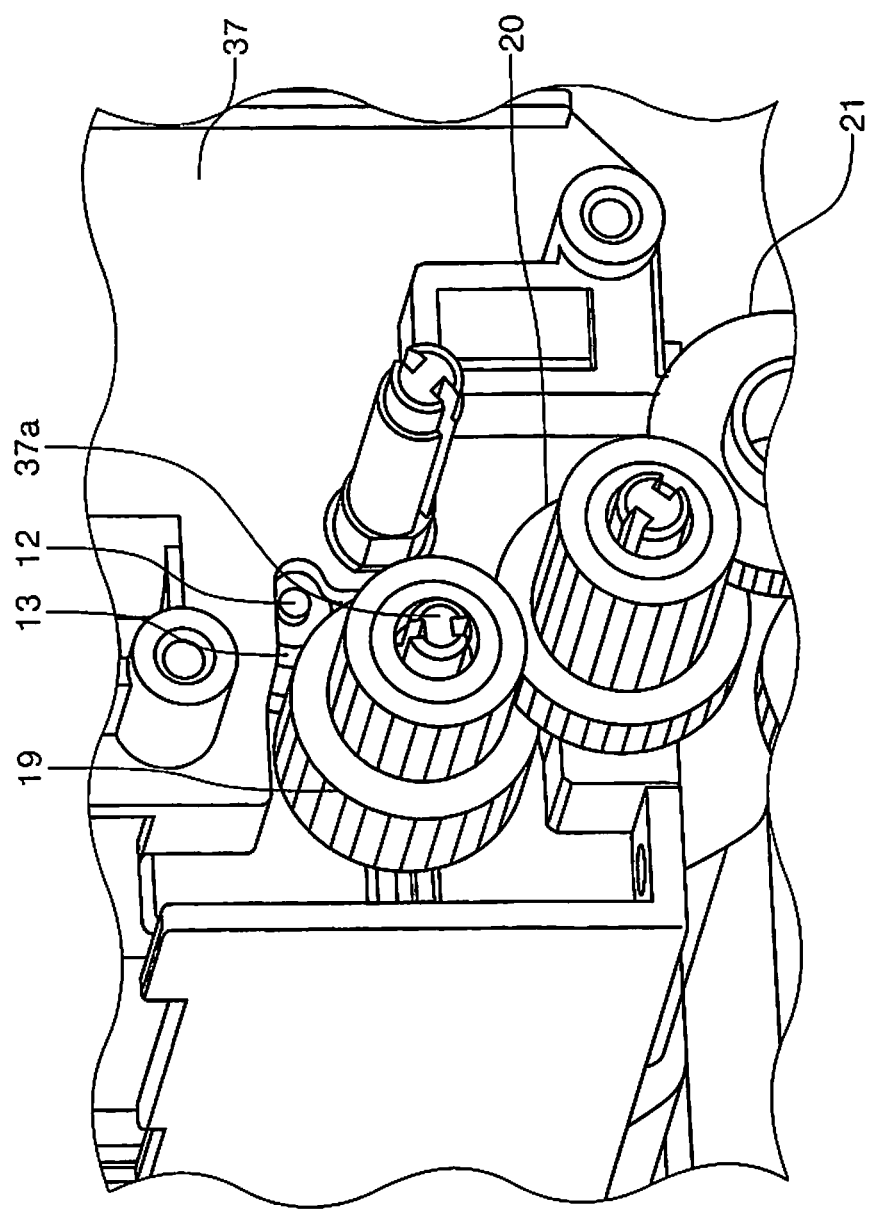
FIG. 6 is a perspective view illustrating the configuration of a gear group of a motor rotational shaft periphery.
Figure 7:
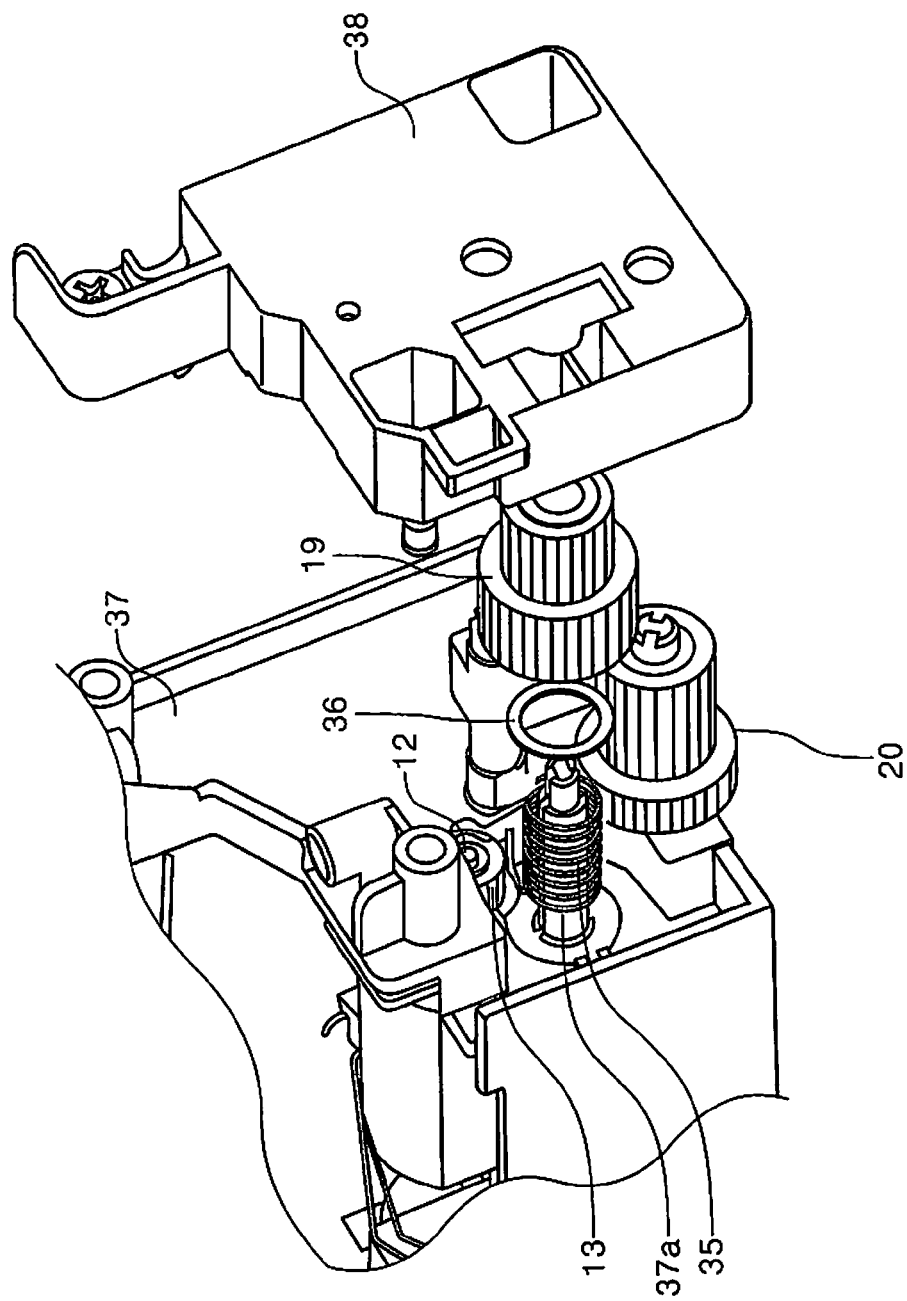
FIG. 7 is an exploded perspective view of a gear group of a motor rotational shaft periphery.
Figure 8:
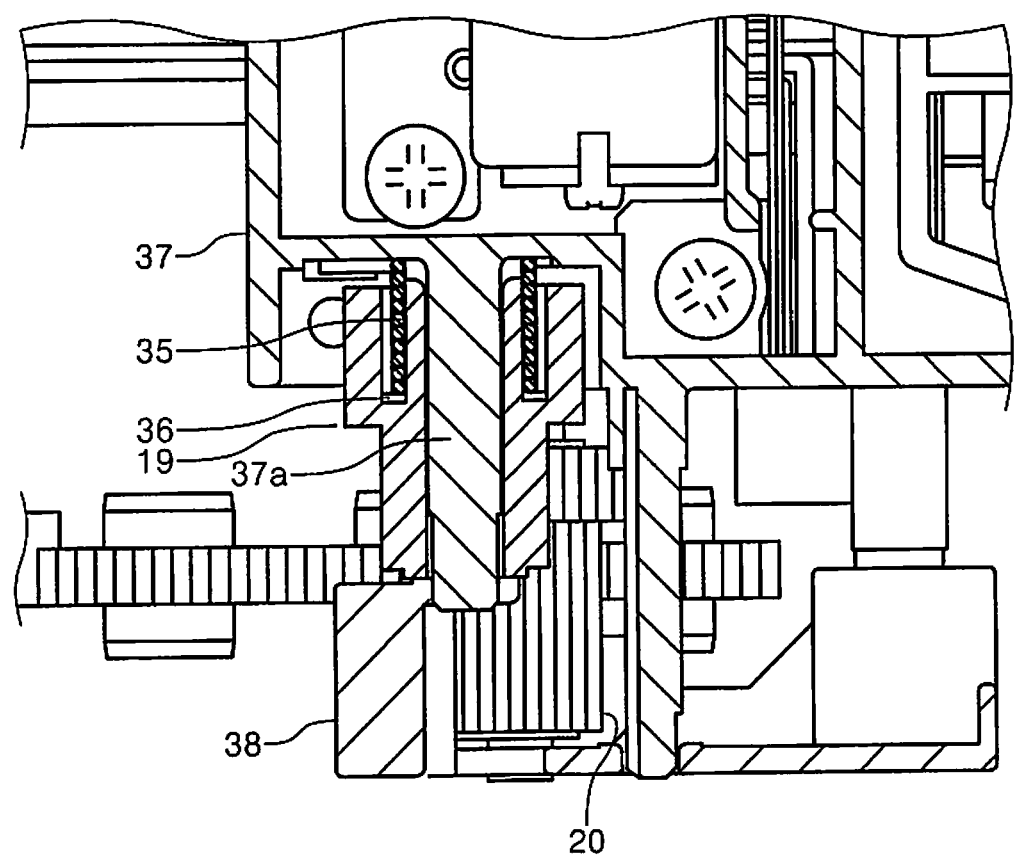
FIG. 8 is a cross-sectional view of a gear group of a motor rotational shaft periphery.
Figure 9:
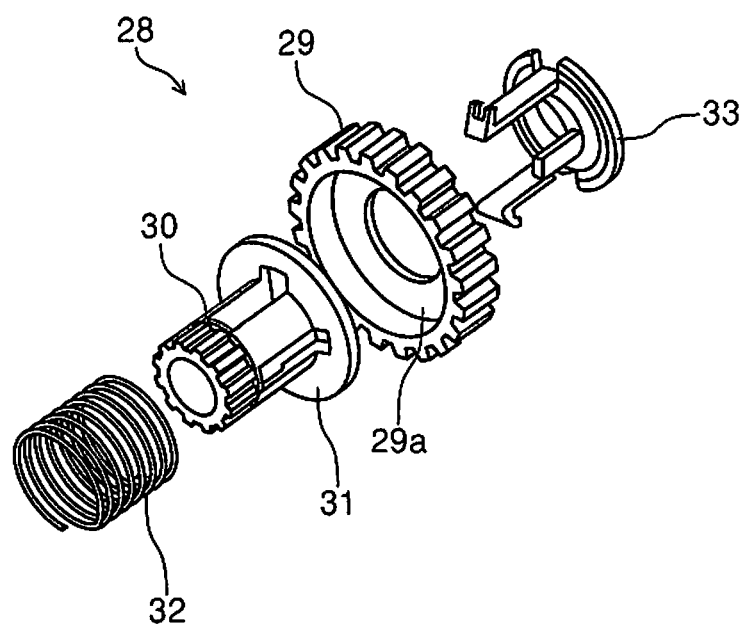
FIG. 9 is an exploded perspective view of a clutch.

FIG. 4 is a drawing illustrating the configuration of a transmission mechanism 18 and the paper discharge receiving tray 4; FIG. 5 is an enlarged perspective view of the transmission mechanism 18; FIG. 6 is a perspective view illustrating the configuration of a gear group of a motor rotational shaft 12 periphery; FIG. 7 is an exploded perspective view thereof; FIG. 8 is a cross-sectional view thereof (a cross-sectional view taken along a plane parallel to the axial direction of the rotational shaft 12); and FIG. 9 is an exploded perspective view of a clutch 28.

Overall Configuration of the Printer

A printer 1 serving as one example of a recording apparatus for recording onto paper, which is one example of a recording medium, is provided with the operation panel 3 on the front side of an apparatus main body 2. The apparatus main body 2 has a housing that houses a feeding unit (not shown) for feeding sheets of paper, a conveying unit (not shown) for conveying the paper, an inkjet recording head 6 for recording text or an image onto the paper using ink, a carriage 7 to which the inkjet recording head and an ink cartridge (not shown) are provided, a control unit 40 (FIG. 5) for controlling the apparatus overall, and the like.

A scanner unit (not shown in detail) for reading a document is also provided to an upper part of the apparatus main body 2. That is to say, the printer 1 is configured to be a so-called multi-function peripheral, which is provided with a recording function for recording onto a recording medium and a reading function for reading a document.

Hereinbelow, the name "front surface" shall be used for the surface to which the operation panel 3 is provided out of the surfaces that form the periphery of the printer I, and the name "back surface" shall be used for the opposite side thereof. The name "apparatus left side" shall be used for the left side in FIGS. 1 to 3, and the name "apparatus right side" shall be used for the right side in FIGS. 1 to 3.

The operation panel 3 provided to the apparatus front surface is a touch panel that can be tilted by a motor 10 (FIG. 4) or can be tilted by a user operation. Provided to the operation panel 3 are: a display unit composed of a liquid crystal display (LCD), organic electroluminescence (EL) display, or the like; and an input unit composed of a variety of buttons (a power source button, a print setting button, and the like) and the like that are pressed by the user; however, a more detailed description is forgone herein. The control unit 40 (FIG. 5) described below transmits signals for display to the operation panel 3, and also obtains a variety of signals from the operation panel 3.

As illustrated in FIG. 1, in a case where the operation panel 3 has been turned as far as a limit in the downward direction and closed, then the front surface of the apparatus main body 2 and the surface of the operation panel 3 are substantially flush with one another. As illustrated in FIGS. 2 and 3, the operation panel 3 can also be turned in an upward direction and opened. The operation panel 3 can also be maintained in a state of incline arbitrarily midway between the closed state (FIG. 1) and the angle (not shown) that is substantially parallel to the upper surface of the printer 1.

Next, the paper discharge receiving tray 4, which serves as a target of driving, shall be described. The paper discharge receiving tray 4 is one example of a medium receiving tray, and is provided so as to be slidingly displaceable with respect to the apparatus main body 2, allowing for displacement between a stowed state (second position: FIG. 2) and a projected state (first position: FIG. 3). The paper discharge receiving tray 4 is stowed inside the apparatus main body 2 when the printer 1 is not being used. When the printer 1 is being used, the paper discharge receiving tray 4 is projected out from the apparatus main body 2, and receives sheets of paper that have been recorded on and discharged.

A paper cassette 8 (FIG. 2) (not shown in full) is detachably provided to an apparatus bottom, being on the lower part of the paper discharge receiving tray 4, and the configuration is such that sheets of paper are fed out from this paper cassette 8. A cover 5 is provided to the paper cassette 8 so as to be openable and closable (rotated). FIG. 1 illustrates a state where the cover 5 has been closed and FIGS. 2 and 3 illustrate a state where the cover 5 has been opened.

The act of opening the cover 5 exposes the paper cassette 8 and the paper discharge receiving tray 4, thus making it possible to execute the sliding action of the paper cassette 8 or the paper discharge receiving tray 4 provided to an upper part thereof, and causes the paper discharge outlet to be opened, thus making it possible to discharge the paper. That is to say, the cover 5 is located on a displacement action pathway of the paper discharge receiving tray 4 when in the closed state, and blocks off the paper discharge outlet when in the closed state.

When, in the state where the cover 5 is closed, the paper discharge receiving tray 4 is projected out toward the advanced state from the stowed state, then the paper discharge receiving tray 4 abuts against the cover 5 and causes the cover 5 to open up.

That is to say, even in a case where the user does not open the cover 5 during recording, the paper discharge receiving tray 4 causes the cover 5 to open up, and therefore paper jams can be prevented and the operation of opening the cover 5 by the user can also be omitted. Additionally, without even the need to separately provide a mechanism by which the cover 5 is automatically opened, the apparatus can be prevented from becoming more complex and from becoming more costly.

Next, the drive mechanism for driving the paper discharge receiving tray 4 shall be described, with reference to FIGS. 4 and subsequent drawings. In FIG. 4, the reference numerals 10 and 11 illustrate motors (in the present embodiment, these are DC motors), which are one example of a drive source, where the reference numeral 10 illustrates a motor serving as a drive source of the operation panel 3 and the reference numeral 11 illustrates a motor serving as a drive source of the paper discharge receiving tray 4. In FIGS. 4 and 5, the reference numeral 18 illustrates a transmission mechanism (power transmission pathway) by which the drive of the motor 11 is transmitted to the paper discharge receiving tray 4. A transmission mechanism by which the driving force is transmitted to the operation panel 3 from the motor 10 is omitted from the description in the present specification.

In the present embodiment, as regards the paper discharge receiving tray 4, the sliding action in the direction of projecting out from the apparatus main body 2 and the sliding action in the direction of being stowed in the apparatus main body 2 are both implemented by the driving force of the motor 11. It is also possible for the paper discharge receiving tray 4 to be directly slid by a user operation, however. The transmission mechanism 18 realizes both the motor driving and manual driving of the paper discharge receiving tray 4 in this manner.

The present embodiment takes a structure whereby the sliding region of the paper discharge receiving tray 4 and the rotation region of the operation panel 3 interfere with one another, and therefore when, for example, the paper discharge receiving tray 4 is projected out from the state illustrated in FIG. 1, then the control unit 40 performs a control for first opening the operation panel 3 and retracting the operation panel 3 from the sliding region of the paper discharge receiving tray 4, and thereafter projecting the paper discharge receiving tray 4 out.

The control unit 40 is constituted of a microcomputer, a dedicated integrated circuit (IC), or the like for executing a control program, and controls the motor 11 in accordance with signals coming from a tray position detecting unit 41 and a rotation sensor 42.

The tray position detecting unit 41 is, for example, a mechanical sensor or an optical sensor, and senses when the paper discharge receiving tray 4 is in the stowed position (the second position: FIGS. I and 2) and when the paper discharge receiving tray 4 is in the most projected position (first position: FIG. 3), and supplies signals indicative thereof to the control unit 40. The rotation sensor 42 is, for example, a rotary encoder, and in the present embodiment, detects rotation of an output gear 30, a two-stage gear 25, a gear 26, or a gear 27 (gear 25) described below. The tray position detecting unit 41 and the rotation sensor 42 may also be omitted.

Next, the configuration of the transmission mechanism 18 shall be described in greater detail. First, a rack section 4a is formed along the direction of sliding on both sides of the paper discharge receiving tray 4, which is the target of transmission of the driving force; pinion gears 16 are enmeshed with the rack sections 4a, thus constituting a rack pinion mechanism. The two pinion gears 16 are attached to a shaft 15, and rotation of this shaft 15 causes the pinion gears 16 to rotate and causes the paper discharge receiving tray 4 to slide.

The gear 27 is provided to an end of the shaft 15 on one side, and the transmission mechanism 18 transmits the power of the motor 11 to the gear 27. In FIG. 5, a pinion gear 13 is provided to the rotational shaft 12 of the motor 11, and the transmission mechanism 18 obtained the driving force of the motor 11 via the pinion gear 13.

The transmission mechanism 18 also is provided with: two-stage gears 19, 20; gears 21, 22, 23; the clutch 28 (an input gear 29 and the output gear 30); the two-stage gear 25; and the gear 26, in the stated order going toward the gear 27 side from the motor 11; the power of the motor 11 is transmitted in the stated order thereof, and then transmitted to the gear 27. The two-stage gears (19, 20, 25) are gears in which two gears (a large gear and a small gear) of a different outer diameter and number of teeth are arranged and integrally formed with the positions thereof offset in the rotational axis direction; the torque from the motor 11 side is received by the large gears, and the torque is transmitted to the paper discharge receiving tray 4 side by the small gears.

Next, the clutch 28 is configured so as to be provided with the input gear 29 and the output gear 30; the driving force (torque) of the motor 11 is received by the input gear 29, and a torque corresponding thereto is transmitted to the output gear 30. However, when there is a predetermined or greater resistance (torque) received by the input gear 29 from the output gear 30 side, then slipping (idling) takes places in the clutch 28, and the output gear 30 does not rotate even though the input gear 29 may be rotating.

FIG. 9 is an exploded view illustrating the configuration of the clutch 28 of such description. The clutch 28 is configured so as to be provided with the input gear 29, a friction surface 29a, the output gear 30, a friction disk 31, a coil spring 32, and a spring retaining member 33.

The output gear 30 and the friction disk 31 are integrally configured, and in an assembled state, the spring retaining member 33, the output gear 30, the friction disk 31, and the coil spring 32 rotate integrally. The spring retaining member 33 retains the coil spring 32, and presses the friction disk toward the friction surface 29a.

The friction surface 29a is formed on the input gear 29, and when the friction disk 31 is pressed toward the friction surface 29a by the spring force of the coil spring 32, this causes a frictional force to be generated between the friction disk 31 and the friction surface 29a. This frictional force regulates a rating (torque at which slipping occurs) of the clutch 28. That is to say, the rating (torque at which slipping occurs) of the clutch 28 is regulated by the pressing force of the coil spring 32 as well as by the coefficient of friction between the friction disk 31 and the friction surface 29a. The input gear 29 transmits the torque of the motor 11 to the output gear 30 via the frictional force between the friction surface 29a and the friction disk 31.

As such, in the event that there is an obstacle on the pathway of projection of the paper discharge receiving tray 4 when, for example, the motor 11 is being driven to cause the paper discharge receiving tray 4 to project out from the stowed state in FIG. 1, then slipping (idling) does not occur in the clutch 28 until the paper discharge receiving tray 4 collides with the obstacle; when the paper discharge receiving tray 4 does collide with the obstacle, the clutch 28 arrives at the rating (the torque at which slipping occurs), and slipping (idling) occurs between the friction surface 29a and the friction disk 31. This prevents damage to the transmission mechanism 18, the motor 11, and the paper discharge receiving tray 4.

Next, a load applying unit for applying a rotational load to a rotational body in the power transmission pathway closer to the motor 11 side than the clutch 28 shall be described with reference to FIGS. 6 to 8. The reference numeral 37 is a frame forming a base of the operation panel 3; a shaft 37a is formed in the frame 37, and the two-stage gear 19 is attached to this shaft 37a. In FIGS. 7 and 8, the reference numeral 38 is a cover attached to the frame 37, and the two-stage gear 19 is prevented from falling off from the shaft 37a by the cover 38.

A coil spring 35 serving as the load applying unit is provided as illustrated in FIGS. 7 and 8 to a base end side of the two-stage gear 19. This coil spring 35 exerts an urging force between the frame 37 and the two-stage gear 19; this urging force acts so as to press the two-stage gear 19 against the cover 38.

That is to say, the coil spring 35 applies a rotational resistance to the two-stage gear 19, which serves as a rotational body. A slip washer 36 is provided to between the coil spring 35 and the two-stage gear 19, causing the slip washer 36 and the two-stage gear 19 to rotate (slide) in a relative manner during rotation of the two-stage gear 19.

The action of the coil spring 35 serving as the load applying unit shall be further described below. The paper discharge receiving tray 4 can be slidingly actuated by the power of the motor 11, as previously stated, but users also have demands, however, such as wishing to be able to operate the paper discharge receiving tray 4 not by the power of the motor 11 but rather directly by hand. In such a case, an external force is applied to the paper discharge receiving tray 4 to move the paper discharge receiving tray 4; in the event that the rotational shaft 12 of the motor 11 ends up turning, then cogging of the motor 11 in some instances causes an unpleasant feeling and noise for the user.

As such, in order to avoid such problems, preferably, slipping (idling) is produced with the clutch 28 before the motor 11 is turned in association with cogging when the paper discharge receiving tray 4 is operated directly by hand, and then the slipping (idling) continues with the clutch 28. That is to say, preferably, the clutch 28 has a smaller slipping start torque than the cogging torque of the motor 11.

However, when the slipping start torque of the clutch 28 ends up being reduced, slipping may in some instances end up taking place in the clutch 28 when the paper discharge receiving tray 4 is being driven by the motor 11, i.e., the torque needed in order to drive the paper discharge receiving tray 4 may in some instances not be obtained.

However, the present embodiment is provided with the load applying unit (coil spring 35) for applying a rotational load to the two-stage gear 19 serving as the rotational body in the power transmission pathway closer to the motor 11 side than the clutch 28, as stated above, and therefore the torque transmitted to the motor 11 can be reduced when an external force is applied to the paper discharge receiving tray 4 to actuate the paper discharge receiving tray 4.

As a result, the motor 11 can be prevented from being turned before the clutch 28 slips (idles), and the problems (noise and the like) associated with when the motor 11 is turned in association with cogging can be avoided. Additionally, the paper discharge receiving tray 4 can be reliably driven by the motor 11, there being no need to reduce the slipping start torque of the clutch 28 in order to prevent the motor 11 from being turned before the clutch 28 slips (idles).

That is to say, it is possible to achieve both reliable driving of the paper discharge receiving tray 4 by the motor 11 and comfort for when the paper discharge receiving tray 4 is being directly operated by a user.

As such, the rotational load that is applied to the two-stage gear 19 by the coil spring 35 serving as the load applying unit is set to a magnitude that idles the clutch 28 before the rotational shaft 12 of the motor 11 rotates against the cogging torque when an external force is applied to the paper discharge receiving tray 4 serving as the target of driving to actuate the paper discharge receiving tray 4.

When the position at which the load applying unit (coil spring 35) applies the load is far removed from the motor 11, however, then there is the risk that the reduction ratio of the gears could cause an increase in the load that needs to be applied to the rotational body, thus increasing the size of the load applying unit (coil spring 35). However, in the present embodiment, the two-stage gear 19 serving as the rotational body to which the rotational load is applied is a gear (first gear) that is enmeshed with the pinion gear 13 attached to the rotational shaft of the motor 11. That is to say, the load is applied to a rotational body located close to the motor 11 and therefore the configuration of the load applying unit can be prevented from increasing in size.

Therefore, for example, the rotational load may be applied to the rotational shaft 12 of the motor 11, or alternatively the rotational load may be applied to the pinion gear 13 attached to the rotational shaft 12.

When the rotation of a second gear (the gear 30, the two-stage gear 24, the gear 26, or the gear 27 in the present embodiment) in the power transmission pathway closer to the paper discharge receiving tray 4 side than the clutch 28 is detected by the rotation sensor 42 serving as a rotation detecting unit for detecting the rotation of the second gear, then it is also possible to drive the motor 11 so that the second gear rotates in the same direction.

In a more specific example, when the user has pressed the paper discharge receiving tray 4 in by a predetermined amount in the state where the paper discharge receiving tray 4 has been projected out, then the aforementioned second gear is located closer to the paper discharge receiving tray 4 side than the clutch 28 and therefore will necessarily rotate by a predetermined amount. That is to say, on the basis of the signal from the rotation sensor 42, the control unit 40 is able to ascertain that the user has pushed the paper discharge receiving tray 4 in by a predetermined amount.

Then, when the rotation sensor 42 has detected the rotation of the second gear, driving the motor 11 so that the second gear rotates in the same direction allows the control unit 40 to stow the paper discharge receiving tray 4 in the stowed position in the above example. This means that there is no need for the user to push the paper discharge receiving tray 4 in all the way. When the paper discharge receiving tray 4 is pulled out by the user in the direction of projection, as well, performing a similar control removes the need for the user to pull the paper discharge receiving tray 4 out all the way in the direction of projection and makes it possible to cause the paper discharge receiving tray 4 to move automatically to the projected position, thus improve the user experience.

The embodiment described above is one example, and a variety of other modifications are also possible. For example, the coil spring was used in the present embodiment as the load applying unit for applying the load to the rotational body, but there is no limitation thereto, and any unit may be used provided that the unit be able to apply a rotational resistance. In the above example, the load applying unit was provided to the power transmission pathway for transmitting the power of the motor 11 to the paper discharge receiving tray 4, but the load applying unit may also be provided between another drive source and target of driving, e.g., to the power transmission pathway for transmitting the power of the motor 10 to the operation panel 3. Moreover, the load applying unit may also be provided to another power transmission pathway for transmitting power to a target of driving from another drive source.

The recording head for carrying out recording need not be of a type that is moved reciprocally by the carriage, but rather a stationary type (so-called line head type) may be used.

The origin of supply of ink, which is the liquid discharged from the recording head, may be an ink cartridge mounted onto the carriage or may be an ink container provided to the carriage exterior. An ink container on the carriage exterior may be provided to the interior of the housing constituting the outer appearance of the recording apparatus, or may be provided to the exterior of the housing. Moreover, the ink container may be configured so as to be replenishable with ink from the exterior or may be a format where an ink pack that contains the ink is replaced.

When ink is supplied to the recording head from the housing exterior, then it is necessary for an ink supply tube for supplying the ink to be routed to the housing interior. Accordingly, it suffices to provide a hole or notch to the housing, the ink supply tube being passed through this hole or notch. Alternatively, there may be a boss or the like set up so as to prevent an opening and closing body, such as a cover or the scanner unit that is provided to the housing so as to be openable and closable, from being fully closed with respect to the housing, the gap formed by the boss being utilized to route the tube to the housing interior. So doing makes it possible to ensure the supply of ink in the flow path of the ink supply tube.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A recording apparatus comprising:
    a drive source configured to apply a driving force and including a motor that has a rotational shaft and a cogging torque;
    a medium receiving tray configured to move in response to at least one of an external force being applied to the medium receiving tray and the driving force of the drive source being applied to the medium receiving tray;
    a clutch configured to idle in response to a predetermined amount of torque or more being applied, the clutch being provided to a power transmission pathway between the drive source and the medium receiving tray;
    a rotational body arranged closer to a side of the drive source than the clutch in the power transmission pathway;
    a load applying unit configured to apply, to the rotational body, a rotational load that has a magnitude that causes the clutch to idle before the rotational shaft of the motor rotates against the cogging torque when the medium receiving tray moves in response to the external force being applied to the medium receiving tray.

2. The recording apparatus as set forth in claim 1, wherein the rotational body is one of the rotational shaft of the motor, a pinion gear attached to the rotational shaft, and a first gear enmeshed with the pinion gear.

3. The recording apparatus as set forth in claim 2, wherein the medium receiving tray is configured to move between a first position of displacement in a direction of projecting out from a main body of the recording apparatus and a second position of displacement in a direction of being pulled into the main body, and receive a recording medium that has been discharged when the medium receiving tray is at the second position.

4. The recording apparatus as set forth in claim 3, further comprising
a second gear arranged closer to a side of the medium receiving tray than the clutch in the power transmission pathway, the second gear being configured to rotate in response to at least one of the medium receiving tray moving by the external force being applied to the medium receiving tray and the driving force of the drive source being applied to the medium receiving tray,
a rotation detecting unit configured to detect rotation of the second gear, and
a control unit configured to control the drive source,
the control unit being configured to drive the drive source such that the second gear continues rotating in the same direction when the rotation detecting unit has detected rotation of the second gear before the control unit commences driving of the drive source.

5. The recording apparatus as set forth in claim 1, wherein the medium receiving tray is configured to move between a first position of displacement in a direction of projecting out from a main body of the recording apparatus and a second position of displacement in a direction of being pulled into the main body, and receive a recording medium that has been discharged when the medium receiving tray is at the second position.

6. The recording apparatus as set forth in claim 1, further comprising
a second gear arranged closer to a side of the medium receiving tray than the clutch in the power transmission pathway, the second gear being configured to rotate in response to at least one of the medium receiving tray moving by the external force being applied to the medium receiving tray and the driving force of the drive source being applied to the medium receiving tray,
a rotation detecting unit configured to detect rotation of the second gear, and
a control unit configured to control the drive source,
the control unit being configured to drive the drive source such that the second gear continues rotating in the same direction, when the rotation detecting unit has detected rotation of the second gear before the control unit commences driving of the drive source.

7. The recording apparatus as set forth in claim 1, wherein
the rotational body is one of the rotational shaft of the motor, a pinion gear attached to the rotational shaft, and a first gear enmeshed with the pinion gear,
the recording apparatus further comprises
a second gear arranged closer to a side of the medium receiving tray than the clutch in the power transmission pathway, the second gear being configured to rotate in response to at least one of the medium receiving tray moving by the external force being applied to the medium receiving tray and the driving force of the drive source being applied to the medium receiving tray,
a rotation detecting unit configured to detect rotation of the second gear, and
a control unit configured to control the drive source, and
the control unit is configured to drive the drive source such that the second gear continues rotating in the same direction, when the rotation detecting unit has detected rotation of the second gear before the control unit commences driving of the drive source.

8. The recording apparatus as set forth in claim 1, wherein
the medium receiving tray is configured to move between a first position of displacement in a direction of projecting out from a main body of the recording apparatus and a second position of displacement in a direction of being pulled into the main body, and receive a recording medium that has been discharged when the medium receiving tray is at the second position,
the recording apparatus further comprises
a second gear arranged closer to a side of the medium receiving tray than the clutch in the power transmission pathway, the second gear being configured to rotate in response to at least one of the medium receiving tray moving by the external force being applied to the medium receiving tray and the driving force of the drive source being applied to the medium receiving tray,
a rotation detecting unit configured to detect rotation of the second gear, and
a control unit configured to control the drive source, and
the control unit is configured to drive the drive source such that the second gear continues rotating in the same direction, when the rotation detecting unit has detected rotation of the second gear before the control unit commences driving of the drive source.

\* \* \* \* \*